United States Patent [19]

Kuusik

[11] 4,194,520
[45] Mar. 25, 1980

[54] TWO STAGE HYDRAULIC GOVERNOR

[75] Inventor: Uno Kuusik, Royal Oak, Mich.

[73] Assignee: Chrysler Corporation, Highland Park, Mich.

[21] Appl. No.: 899,686

[22] Filed: Apr. 24, 1978

[51] Int. Cl.$^2$ ............................................. G05D 13/36
[52] U.S. Cl. .......................................... 137/54; 137/56
[58] Field of Search ................. 137/54, 56; 74/752 C

[56] References Cited

U.S. PATENT DOCUMENTS

| | | | |
|---|---|---|---|
| 2,711,749 | 6/1955 | Hettinger | 137/54 |
| 3,048,184 | 8/1962 | Duffy | 137/54 X |
| 3,225,778 | 12/1965 | Londal | 137/54 |
| 3,322,133 | 5/1967 | Searles | 137/54 |
| 3,401,709 | 9/1968 | Miller | 137/56 |
| 3,431,928 | 3/1969 | Pierce | 137/54 |
| 3,450,144 | 6/1969 | Horsch | 137/54 |
| 3,552,409 | 1/1971 | Michnay | 137/54 |
| 3,631,871 | 1/1972 | Shimosaki | 137/54 |

*Primary Examiner*—Robert G. Nilson
*Attorney, Agent, or Firm*—Baldwin & Newtson

[57] ABSTRACT

A pair of piston valve members are slidably mounted in a housing rotatably engaging the output shaft of the automatic transmission. A first piston valve moves freely under the influence of centrifugal force within the housing to throttle line pressure from a pump in the transmission to a governed pressure level used for performing shifting functions within the transmission and the second piston valve member is spring biased against the influence of centrifugal force to prevent its movement under the influence thereof until a predetermined output shaft speed is reached whereupon it throttles the line pressure supplied by the transmission pump and directs it to a portion of the first piston valve to vary the operation thereof upon further increases in output shaft speed. The piston valves are arranged so that no mechanical connection between them is required to effect the two-stage operation and venting of fluid from each of the valves is effected in an outward direction to permit discharge of the contaminants under the influence of centrifugal force.

2 Claims, 9 Drawing Figures

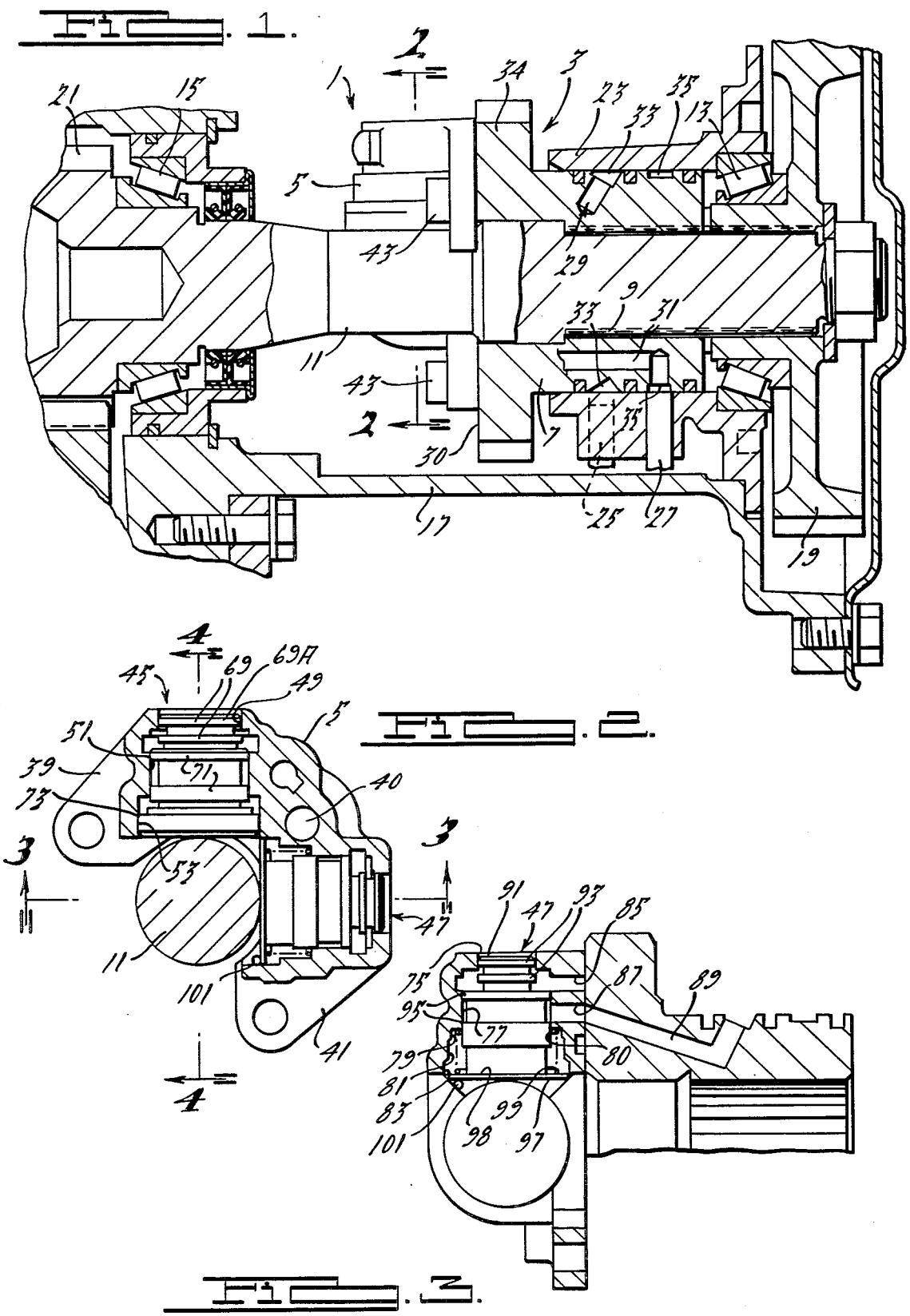

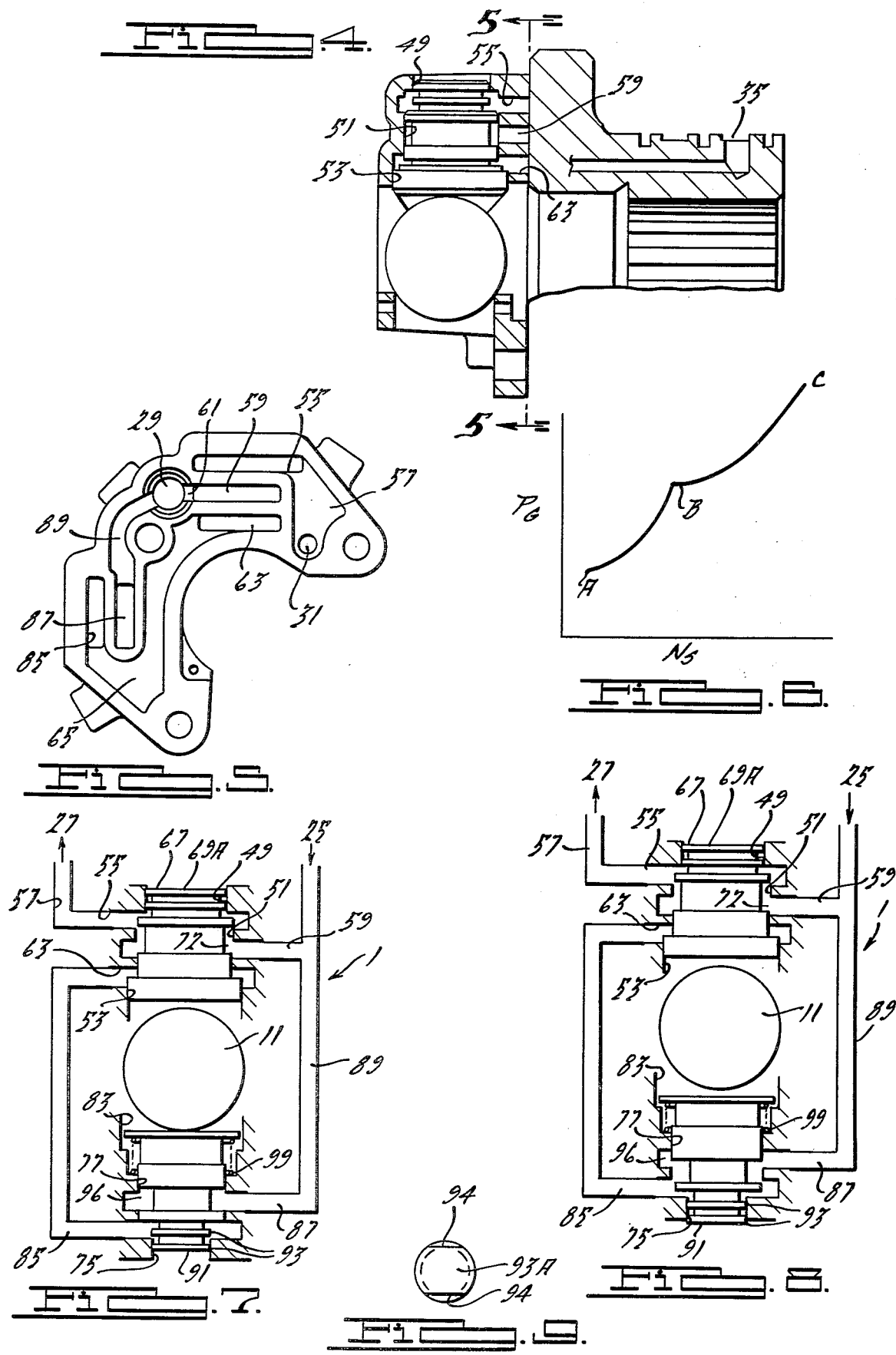

TWO STAGE HYDRAULIC GOVERNOR

BACKGROUND OF THE INVENTION

This invention relates generally to centrifugal force operated hydraulic governors and more particularly to a hydraulic governor adapted to be mounted adjacent the periphery of an automatic transmission output shaft and adapted to provide a two-stage transmittal of governor pressure in response to changes in output shaft speed.

Briefly, this invention comprises a housing member rotatably supported for rotation with the output shaft of an automatic transmission, a first-stage piston valve fluidly connected to a source of line pressure in the transmission and operative under the influence of centrifugal force to transmit pressurized fluid to shift actuating members of the transmission at a level proportional to the square of the output shaft, and a second piston valve member also slidably received in the housing and resiliently biased against the influence of centrifugal force created by rotation of the output shaft and commonly fluidly connected to the source of line pressure with the first piston valve member and operative to supply a pressure signal proportional to the square of the speed of the output shaft to a portion of the first piston valve member to modify the pressure output thereof. Each of the piston valve members also includes means for effecting outboard venting of contaminants under the influence of centrifugal force.

One of the primary objects of the invention is to provide a hydraulic governor adapted to be mounted on the output shaft assembly of an automatic transmission without requiring an aperture be provided through the output shaft to provide interconnection between components effecting two-stage operation.

Another object of the invention is to provide a hydraulic governor of the type described which may be conveniently mounted on pre-existing components of the transmission output shaft assembly.

A further object of the invention is to provide a hydraulic governor of the type described which has a single body member containing a pair of valve members adapted to operate in response to changes in the rotational speed of the output shaft to the transmission to modify a line pressure and produce pressure related to the speed of rotation of the output shaft.

Still another object of the invention is to provide a hydraulic governor of the type described which utilizes passages formed in the housing for fluidly interconnecting the two valve members.

Yet another object of the invention is to provide a hydraulic governor of the type described that is radially removable from the output shaft.

A further object of the invention is to provide a hydraulic governor of the type described which is economical in construction and effective in operation.

Other objects and advantages of the invention will be apparent to those skilled in the art of hydraulic governors upon reading the accompanying description and claims.

BRIEF DESCRIPTION OF THE DRAWINGS

In the accompanying drawings in which one embodiment of the invention hydraulic governor is illustrated:

FIG. 1 is a vertical section taken through an output shaft of an automatic transmission; certain parts being shown in full line for clarity.

FIG. 2 is a section taken along line 2—2 of FIG. 1, the view being rotated 90° (degrees) clockwise for clarity.

FIG. 3 is a section taken along line 3—3 of FIG. 2, the view being rotated 90° (degrees) counterclockwise.

FIG. 4 is a section taken along line 4—4 of FIG. 2.

FIG. 5 is a partial cross section taken along line 5—5 of FIG. 4.

FIG. 6 is a graphical illustration of a governor pressure-speed curve for the governor of the present invention.

FIG. 7 is a diagrammatic illustration of the valves of the key governor of the present invention during the first stage of operation.

FIG. 8 is a view similar to FIG. 7 showing the valves of the governor of the present invention during a secondary stage of operation, and FIG. 9 is an end view of a secondary valve of the governor of the present invention, illustrating the method whereby outward venting of the valve is effected.

DESCRIPTION OF THE PREFERRED EMBODIMENTS

Referring now to the drawings, and particularly to FIG. 1, the hydraulic governor assembly constructed in accordance with the invention is indicated generally by the numeral 1. The assembly includes generally a governor support member 3 and a governor body 5. The support member 3 includes an elongated hub 7 having a splined opening 9 therein through which an output shaft 11 of a transmission extends and is drivingly engaged. Shaft 11 is supported for rotation on bearings 13 and 15 in a transmission housing 17 and has a differential input gear 21 formed on the other end thereof. An input gear 19 is adapted to be driven by transmission components located in the upper part (not shown) of the housing 17. Generally, a torque converter (not shown) is located adjacent the input end (left end as viewed in FIG. 1) of the transmission. Input drive from a prime mover such as an automotive engine is obtained through the torque converter and certain rotating parts (not shown) to the rear of the housing where a gear (not shown) drives the input gear 19. The drive is then transferred by the shaft 11 to gear 21 which drives a differential unit. This type of transmission is shown in more detail in co-pending U.S. application, Ser. No. 713,460, entitled "Power Transmission Driveline Unit", and is particularly adapted for use in vehicles utilizing a transversely extending engine and having a front wheel drive. A hub support member 23 is mounted in housing 17 and surrounds the hub 7. The support member 23 has passages 25 and 27 formed therein for delivery of line pressure fluid to and delivery of governor modulated pressure fluid from the governor 1. The hub 7 has passages 29 and 31 therein connecting with the passages 25 and 27 and to the face 30 of a radially extending carrier and parking sprag portion 34. Passage 29 includes an annular passage 33 and passage 31 includes an annular passage 35, both of which are continuously in communication with passages 25 and 27. The body 5, as may best be seen in FIG. 2, has flanges 39 and 41 formed thereon through which fasteners 43 extend and secure the body to the annular sprag portion 34 of the support 3. An additional mounting screw hole 40 may likewise be formed through the body 5. It should be noted that the generally L-shaped configuration of the body 5 as shown in FIG. 2 permits radial insertion of the governor 1 and radial removal thereof. The body 5 has two bores 45 and 47 extending preferably at right angles to one another and having center lines which may intersect the axis of the shaft 11. Bore 45 will be hereinafter referred to as the primary bore. It is a stepped bore and has three different diametral portions 49, 51 and 53; portion 49 being the smallest in diameter, portion 51 being of an intermediate diameter and portion 53 being the largest diameter. Portion 49, as may best be seen in FIGS. 4 and 5, is connected by a port 55 and passage 57 to passages 31 and 35 and thence to the governor modulated pressure passage 27.

Portion 51 is connected by a port 59 and a passage 61 to passages 29 and 33 and thence to the line pressure passage 25. Portion 53 is connected by a port 63 and a passage 65 to a portion of the bore 47 for a purpose to be described subsequently in more detail.

A primary piston valve member 67 is slidably received in the bore 45 and includes a number of spaced lands diametrally sized for sliding engagement with the stepped portions 49, 51, 53 of the bore 45. Specifically, a small diameter land 69 (actually formed as a pair of spaced lands) is received in portion 49; an intermediate diameter land 71 (actually formed as a pair of spaced lands) is received in portion 51; and a large diameter land 73 is received in portion 53.

Bore 47, which will be hereinafter referred to as the secondary bore is also formed as a stepped bore and preferably includes five different diametral portions 75, 77, 79, 81 and 83; portion 75 being the smallest, portion 83 the largest, and the remaining portions sized sequentially intermediate as may best be seen in FIG. 3. Portion 75 is connected by a port 85 to the passage 65 associated with portion 53 of the primary bore. Portion 77 is connected by a port 87 and a passage 89 to passages 29 and 33 and thence to the line pressure passage 25.

A secondary piston valve member 91 is slidably received in the bore 47 and includes three spaced lands 93, 95, 97 sized for engagement with bore portions 75, 77 and 83, respectively. Lands 93 and 95 slidingly sealingly engage bore portions 75 and 77 and land 97 is sized for clearance with bore portion 83. The smallest land 93 is formed as a pair of lands and has a pair of flats 94 formed in the outer periphery of the outermost of the pair designated 93A as may best be seen in FIG. 9. The same construction is preferably utilized in the smallest land 69 of primary valve member 67. A spring 99 is piloted in the bore portion 79 and is retained between a shoulder 80 at the outer terminus of the bore portion 79 with respect to the output shaft 11 and an inner shoulder 98 of valve member land 97. Relief for the spring 99 is provided by the bore portion 81, and assembled height of the spring 99 is established by limiting inward travel of the secondary valve member 91 with respect to the shaft 11 by positioning the valve member 91 in abutting relationship therewith. Installation of a pin 101 in the governor housing 5 provides retention of the spring loaded valve member 91 during assembly.

OPERATION OF THE PREFERRED EMBODIMENT

To best relate the function of the hydraulic governor of the present invention, reference will be made now to FIGS. 6-8, the latter two of which diagrammatically illustrate the valving function of the present invention.

Turning first to FIG. 7, the hydraulic governor 1 of the present invention is illustrated with the primary and secondary piston valve member 67, 91 in positions they assume during relatively slow speed operation of the transmission output shaft 11. Rotation of the governor 1 with the output shaft 11 tends to cause radial outward movement of the piston valve members 67, 91 under the influence of centrifugal force. Secondary piston valve member 91, however, is held to its full inward installed position under the influence of the spring 99. As shaft speed increases pressurized fluid from the line pressure passage 29 is directed to the governor modulated pressure passage 27 according to a control schedule as shown in the curve A-B of FIG. 6, that is governor pressure increases parabolically with shaft speed. This is accomplished by introducing fluid in the annular groove 72 formed by the spaced intermediate lands 71 and the primary bore intermediate portion 53 and metering it to the governor modulated pressure passage 27 as the radially outer land 71 opens communication with the port 55. While this metering function is performed, leakage of controlled pressure fluid in the radially outward direction is prevented by the sliding engagement of the small diameter land 69 in the bore portion 49. Minor amounts of fluid leakage and contaminants are permitted to migrate outward, however, by flats formed on the outer land 69A whenever centrifugal and fluid pressure forces acting on the valve member 67 position it as shown in FIG. 2 with the inner portion of land 69 disengaged from the bore portion 49. This tends to prevent contamination and consequent sticking of the piston valve member 67.

Two-stage operation of the hydraulic governor 1 of the present invention is effected at relatively higher speeds in a manner that may best be appreciated by reference to FIG. 8. At speeds above a predetermined level corresponding to point B of FIG. 6 centrifugal force operates on the secondary piston valve member 91 to overcome the assembled preload of the spring 99 to permit radially outward movement of the member 91 in the same manner as the primary piston valve member 67. Pressurized fluid from the line pressure passage 25 is introduced through the port 87 to the annular groove 96 formed between the spaced lands 95 of the valve member 91 and the bore portion 77. Fluid is metered at a pressure increasing with the square of the speed of the shaft 11 to the port 85 and thence to the passage 63 which communicates with the enlarged portion 53 of the primary bore 45. Metered fluid pressure thereby acts on the annular area of the largest land 73 of the primary piston valve member 67 which exceeds the diameter of the intermediate lands 71. The force thereby created opposes the centrifugal force operating on the primary piston valve member 67 and effects the metering schedule described by curve B-C of FIG. 6 as speed increases beyond point B.

Outboard leakage and contaminant migration are effected by use of the flats 94 on the outer land 93A as described above with reference to the primary piston valve member.

Construction and operation of the invention governor 1 as here described then, effects two-stage linearization of an automatic transmission hydraulic governor in a simple, economical, and reliable manner. While only one embodiment of the invention governor has been described, others may be possible without departing from the scope of the appended claims.

What is claimed is:

1. A speed hydraulic governor for controlling the pressure at which fluid is directed from a fluid pressure source to actuating elements of an automatic transmission having an output shaft, the governor comprising:
   A. housing means adapted to be carried for rotation with said output shaft and radially removable therefrom;
   B. a primary spool valve member having a plurality of speed lands and mounted for reciprocal movement within a primary bore formed in said housing means along a first axis normal to the axis of said output shaft, operative under the influence of centrifugal force during rotation of said shaft to direct fluid from said pressure source to said actuating elements at a governed pressure level varying directly with the rotational speed of said shaft, and including a fluid pressure responsive portion;
   C. a secondary spool valve member having a plurality of spaced lands and mounted for reciprocal movement within a secondary bore formed in said housing along a second axis normal to said first axis and to the axis of said shaft and operative under the influence of centrifugal force during rotation of said shaft to direct fluid from said pressure source to said primary valve pressure responsive portion at a pressure level varying directly with the rotational speed of said shaft;
   D. means for resiliently biasing said secondary valve member to a position wherein said directing of fluid is not effected until a predetermined rotational speed is attained; and
   E. vent means formed on each of said primary and secondary spool valve members for effecting the venting of fluid radially outwardly from said output shaft under the influence of centrifugal force during a portion of said reciprocal movement.

2. A governor as defined in claim 1 wherein said vent means comprises flat means formed on said primary and secondary spool valve members at the ends thereof remote from said output shaft.

* * * * *